United States Patent [19]

Mitamura et al.

[11] Patent Number: 6,130,491

[45] Date of Patent: Oct. 10, 2000

[54] MOTOR WITH SELF-COOLING FAN

[75] Inventors: Seiji Mitamura, Yonago; Haruki Kato, Tottori-ken, both of Japan

[73] Assignee: Matsushita Electric Industrial Co., Ltd., Japan

[21] Appl. No.: 09/362,727

[22] Filed: Jul. 29, 1999

[30] Foreign Application Priority Data

Jul. 31, 1998 [JP] Japan .................................. 10-217269

[51] Int. Cl.[7] .............................. H02K 9/04; H02K 9/06; H02K 11/00
[52] U.S. Cl. .............................. 310/62; 310/68 R; 310/64
[58] Field of Search .............................. 310/62, 63, 67 R, 310/64, 68 R; 416/186 R, 187

[56] References Cited

U.S. PATENT DOCUMENTS

| | | | |
|---|---|---|---|
| 4,074,156 | 2/1978 | Widstrand et al. | 310/62 |
| 4,128,778 | 12/1978 | Merkle et al. | 310/67 R |
| 4,431,931 | 2/1984 | Perrier et al. | 310/62 |
| 4,885,488 | 12/1989 | Cox | 310/63 |
| 4,904,891 | 2/1990 | Baker et al. | 310/62 |
| 5,288,216 | 2/1994 | Bolte | 310/62 |
| 5,844,338 | 12/1998 | Horski | 310/67 R |

*Primary Examiner*—Clayton LaBalle
*Attorney, Agent, or Firm*—Parkhurst & Wendel, L.L.P.

[57] ABSTRACT

In a circuit-integrated motor, it is an object of the invention to solve a problem that high power output is hampered by a heated electronic component, and to provide a compact high-power motor with a self-cooling fan which is capable of affording a significant cooling effect on the electronic component and winding wire. A self cooling fan (15) disposed close to and in an opposed relation to a top face of a rotor frame (11) has a peripheral-face opening (16), and an electronic component or a radiator attached with the electronic component is located in the course of a flow passage (17) of cooling air guidedly discharged from the peripheral-face opening (16).

6 Claims, 5 Drawing Sheets

MOTOR WITH SELF-COOLING FAN

FIELD OF THE INVENTION

The present invention relates to the construction of a motor with a self-cooling fan for cooling an electronic component near the motor and winding wires of the motor.

BACKGROUND OF THE INVENTION

One conventionally known self-cooling motor with a self-cooling fan is disclosed in Japanese Patent Application Laid-open No. 9-65632. FIG. 6 illustrates the construction of the conventional motor with a self-cooling fan. Referring to FIG. 6, a housing 1 retains bearings 2 and 3. A plate 4 retains a printed board 5 and holds the housing 1 by clamping. A core 6 has a winding wire 8 wound thereon via an insulating layer 7 so as to compose a stator. A screw 9 extends through the core 6 to be tightened to the housing 1, thereby pressing the stator against the housing 1 in a fixed relation. A rotor shaft 10 has a rotor frame 11 press-fitted thereon in a fixed relation, the rotor frame 11 adherently retaining a magnet arranged along a periphery of the core 6 via a gap. The rotor shaft 10 is press-fitted in inner rings of the bearings 2 and 3, outer rings of which are retained by the housing 1. An electronic component 12 is fixed to a radiator plate 14 by means of a screw 13 so as to be jointly mounted to the printed board 5. A self-cooling fan 15 has a larger outside diameter than the rotor frame 11 and is fixed to the rotor shaft 10.

In a brushless motor of the aforementioned construction, the winding wire produces heat in proportion to the amount of current flowing therethrough but the heat-producing winding wire is cooled by cooling air from the self-cooling fan unitarily rotating with the rotor shaft, via the plate, housing, core and insulating layer. Thus, the temperature is prevented from rising.

Because of the arrangement wherein the self-cooling fan 15 has the larger outside diameter than the rotor frame 11, and opposes the electronic component 12 and radiator plate 14 disposed on the periphery of the rotor, the electronic component and radiator plate may be located in a passage of a direct air flow from the fan. This provides a notable cooling effect on the electronic component and radiator plate.

In the conventional construction, however, the air flow from the self-cooling fan runs axially of the rotor. For effective cooling of the electronic component or the radiator attached with the electronic component, the outside diameter of the self-cooling fan needs be larger than that of the rotor. In addition, the self-cooling fan needs be spaced from the rotor to define a gap therebetween and the electronic component or the radiator attached with the electronic component needs be disposed at a place opposing the self-cooling fan. This poses a problem that the motor increases in size and the position of the electronic component or the radiator attached with the electronic component is restricted.

SUMMARY OF THE INVENTION

The invention has an object to solve the aforementioned problems in the prior art, and to provide a compact high-power motor with a self-cooling fan wherein the self-cooling fan has an outside diameter equal to or less than that of a rotor and may be located in close vicinity of a top face of a rotor frame and wherein the position of an electronic component or a radiator attached with the electronic component is not restricted.

For solving the foregoing problems, the inventive motor with a self-cooling fan disposed at a rotor having a rotor shaft is arranged such that the self-cooling fan has a cup-like shape and includes an opening in its periphery in order for drawing air from the direction of the axis of rotation of the rotor and guidingly discharging the drawn air in the radial direction of the rotor, and that an electronic component or a radiator attached with the electronic component is located in the course of a flow passage of the air drawn and guidedly discharged.

Accordingly, a compact high-power motor with a self-cooling fan is provided, wherein the self-cooling fan may be located in close vicinity of the top face of the rotor and needs not have a larger outside diameter than that of the rotor, and wherein the flow passage of cooling air may be formed over the place at which the electronic component or the radiator attached with the electronic component is located.

According to a first aspect of the invention, a motor with a self-cooling fan disposed at a rotor having a rotor shaft is characterized in that a self-cooling fan has a cup-like shape and includes an opening in its periphery in order for drawing air from the direction of the axis of rotation of the rotor and guidingly discharging the drawn air in the radial direction of the rotor, and that an electronic component or a radiator attached with the electronic component is located in the course of a flow passage of the air drawn and guidedly discharged. The air flow from the self-cooling fan directly cools the electronic component or the radiator attached with the electronic component, thereby providing a remarkable heat dissipation effect.

According to a second aspect of the invention, the motor with a self-cooling fan is characterized in that the self-cooling fan comprises a boss holding the rotor shaft, a plurality of blades arranged substantially radially with respect to the axis of rotation and respectively engaging at one end thereof with the periphery of the boss, and a blade cover having a hole in the center thereof and engaging with ridges and peripheral faces of the plurality of blades, said boss, blades and blade cover being integrally formed in one body, and that one or more peripheral-face openings are formed by defining a axial length of a peripheral face of the blade cover to be shorter than an axial length of the blade. Such a definition of the axial length of the peripheral face of the blade cover permits the formation of the flow passage of cooling air at a predetermined angle to the axis. Changing the axial length of the peripheral face of the blade cover permits the flow passage of cooling air to form an arbitrary angle to the axis. Thus, such an effect is afforded as to eliminate the restriction on the position of the electronic component or the radiator attached with the electronic component.

According to a third aspect of the invention, the motor with a self-cooling fan is characterized in that the self-cooling fan includes an even number of blades and the peripheral-face openings of the blade cover are arranged alternately with closed peripheral sections along the periphery of the blade cover which is partitioned by the blades. Since the peripheral-face openings and the closed peripheral sections are provided in an equal number, a good weight balance with respect to the axis is accomplished for reduction of vibrations resulting from the rotation of the self-cooling fan. In addition, the cooling air flowing out of the peripheral opening defines a flow passage at a predetermined angle to the axis while the cooling air discharged from the closed peripheral section defines a flow passage along the axis, whereby a plurality of flow passages may be formed for supplying the cooling air to a wider area.

According to a fourth aspect of the invention, the motor with self-cooling fan is characterized in that the self-cooling fan has an outside diameter substantially equal to or smaller than that of a rotor frame and is disposed in close vicinity of a top face of the rotor frame. Since the flow passage of the cooling air is formed at a predetermined angle to the axis, the cooling air can be directly guided to the electronic component or the radiator attached with the electronic component even if the self-cooling fan has a smaller outside diameter than that of the rotor and is disposed close to the rotor frame. Thus, the compact high-power motor with a self-cooling fan can be realized.

According to a fifth aspect of the invention, the motor with self-cooling fan is characterized in that the self-cooling fan has an outside diameter substantially equal to or smaller than that of a motor case and is disposed in close vicinity of a top face of the motor case. Since the flow passage of the cooling air is formed at a predetermined angle to the axis, the cooling air can be directly guided to the electronic component or the radiator attached with the electronic component even if the self-cooling fan has a smaller outside diameter than that of the motor case and is disposed close to the motor case. Thus, the compact high-power motor with a self-cooling fan can be realized.

According to a sixth aspect of the invention, the motor with self-cooling fan is characterized in that a rotor frame holding the rotor shaft is formed with an opening in its top face for introducing air flow partially into the rotor frame, the air flow coming from the self-cooling fan disposed in an opposed relation to this opening. Thus accomplished is an excellent motor with a self-cooling fan which is capable of directly cooling the winding wire of an outer rotor and thereby permitting a high current flow for high power output.

According to a seventh aspect of the invention, the motor with a self-cooling fan is characterized in that an opening is formed a motor case retaining a bearing which holds the rotor shaft rotatably, in order to introduce air flow partially into the motor case, the air flow coming from the self-cooling fan disposed in an opposed relation to this opening. Thus accomplished is an excellent motor with a self-cooling fan which is capable of directly cooling the winding wire of the outer rotor and thereby permitting a high current flow for high power output.

PREFERRED EMBODIMENTS

Now preferred embodiments of the invention will be described with reference to the accompanying drawings.

(First Embodiment)

Figure 1:
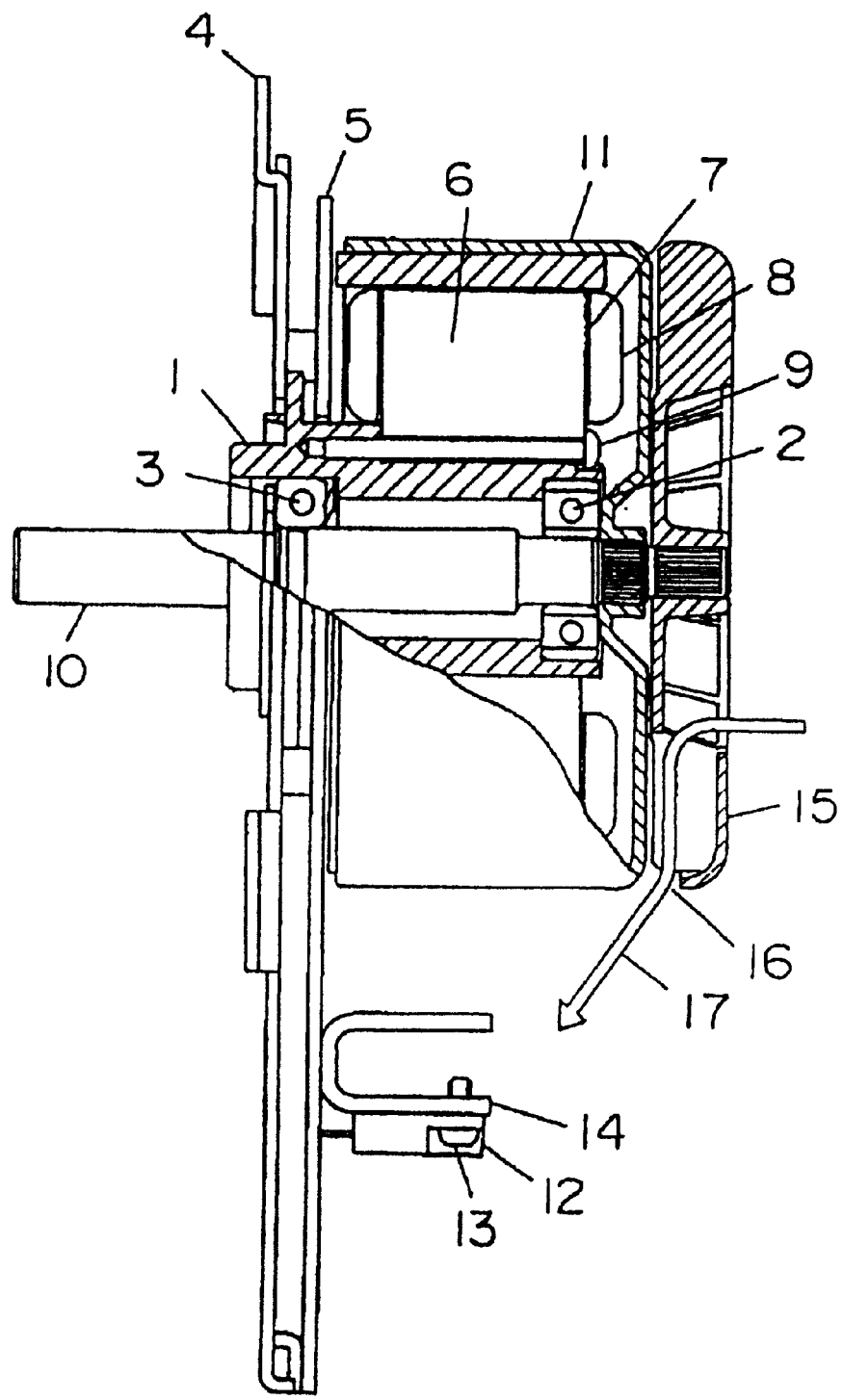
FIG. 1 is a diagram showing a construction of a motor with a self-cooling fan according to a first embodiment of the invention.

FIG. 1 illustrates a construction of a motor with a self-cooling fan according to a first embodiment of the invention. Referring to FIG. 1, a housing 1 retains bearings 2 and 3. A plate 4 retains a printed board 5 and holds the housing 1 by clamping. A core 6 has a winding wire 8 wound thereon via an insulating layer 7 so as to compose a stator. A screw 9 extends through the core 6 to be tightened to the housing 1 thereby pressing the stator against the housing 1 in a fixed relation. A rotor shaft 10 has a rotor frame 11 press-fitted thereon in a fixed relation, the rotor frame 11 adherently retaining a magnet arranged along the periphery of the core 6 via a gap. The rotor shaft 10 is press-fitted to inner rings of the bearings 2 and 3, of which outer rings are retained by the housing 1. A self-cooling fan 15 is formed with a peripheral-face opening 16 in its periphery and fixed to the rotor shaft 10. An electronic component 12 is fixed to a radiator plate 14 by means of a screw 13 so as to be mounted to a place in the course of a flow passage of a cooling air guidedly discharged from the peripheral-face opening 16 of the self-cooling fan 15. In this embodiment, the self-cooling fan 15 has substantially the same outside diameter as the rotor frame 11 and is located close to a top face of the rotor frame.

In the motor with a self-cooling fan of the above construction, the winding wire 8 produces heat in proportion to the amount of current flowing therethrough but the heat-producing wire 8 is cooled by the cooling air from the self-cooling fan 15 rotating unitarily with the rotor shaft 10, via the rotor frame 11, bearing 2, housing 1, core 6 and insulating layer 7, thereby preventing the temperature from rising. Further, the self-cooling fan 15 is formed with the peripheral-face opening 16 in its periphery for forming a cooling-air flow passage 17 in the radial direction of the rotor. This allows direct cooling of the electronic component 12 and the radiator plate 14 located in the course of the flow passage, and provides a notable cooling effect on the electronic component and the radiator plate. Since the cooling-air flow passage 17 is formed at a predetermined angle to the axis, the self-cooling fan 15 need not have the greater outside diameter than that of the rotor frame 11. In addition, even if the self-cooling fan is located close to the top face of the rotor frame, the cooling air therefrom can be guided directly to the electronic component or the radiator attached with the electronic component. Thus, a significant cooling effect can be obtained.

(Second Embodiment)

Figure 2:
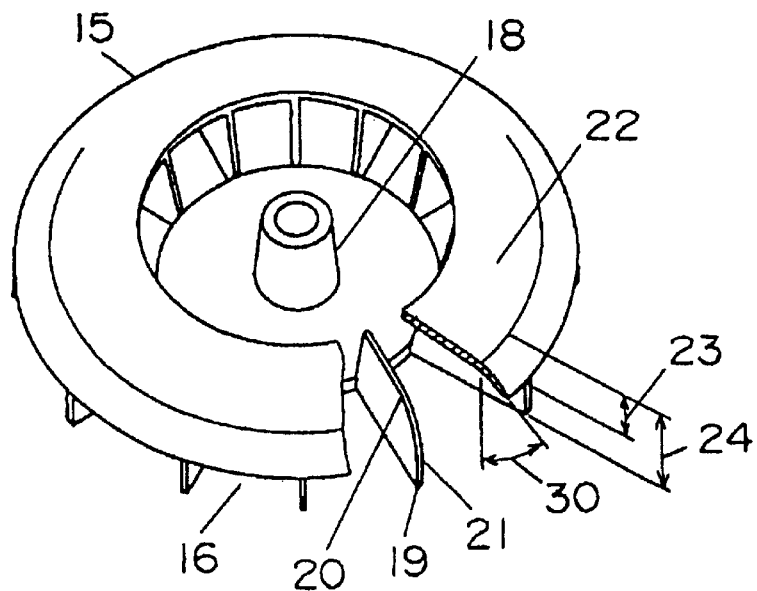
FIG. 2 is a diagram showing a construction of a self-cooling fan for use in a motor according to a second embodiment of the invention for illustration of operations of the self-cooling fan.

FIG. 2 is a diagram showing a construction of a self-cooling fan for use in a motor according to a second embodiment of the invention for illustration of operations of the self-cooling fan. Referring to FIG. 2, the self-cooling fan 15 comprises a boss 18 holding a rotor shaft, a plurality of blades 19 which are arranged radially with respect to the axis of rotation and respectively engaging at one end thereof with the periphery of the boss 18, and a blade cover 22 having a hole in the center thereof and engaging with ridges 20 and peripheral faces 21 of the plurality of blades. These boss, blades and blade cover are integrally formed in one body. The self-cooling fan is formed with peripheral-face openings along its entire circumference. The peripheral-face opening is formed by defining an axial length 23 of a peripheral face of the blade cover 22 shorter than an axial length 24 of the blade 19.

According to this embodiment, the rotor shaft rotates to bring the self-cooling fan into unitary rotation therewith, and the peripheral face of the blade cover 22 has the smaller axial length 23 than the axial length 24 of the blades 19 so that air present in spaces partitioned by the blades 19 is centrifugally moved along the circumferential direction of the fan to be circumferentially discharged therefrom. Additionally, the peripheral portion of the blade cover 22 is inclined at an angle of 30° with respect to the axial direction, and the direction of the air flow is controlled so that the air is circumferentially discharged therefrom for establishing the flow passage at an arbitrary angle with respect to the axis. The circumferential movement of air due to the centrifugal force results in pressure reduction in the fan such that fresh air is drawn thereinto through the central hole of the blade cover. Such processes continue to create the cooling-air flow passage in which the air is drawn from the direction of the axis of rotation and the air thus drawn is guidedly discharged from the fan in the radial direction of the rotor. The direct cooling of the electronic component or the radiator attached with the electronic component is accomplished by locating these components in the course of the cooling-air flow passage. Thus, the significant cooling effect can be accomplished.

(Third Embodiment)

Figure 3:
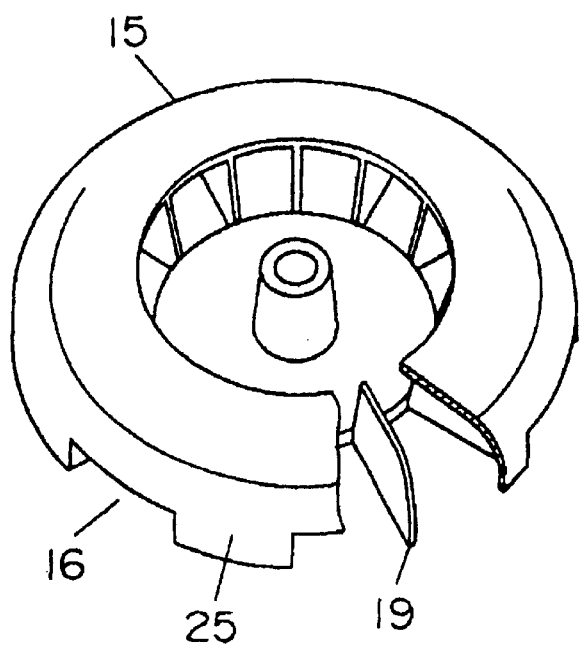
FIG. 3 is a diagram showing a construction of a self-cooling fan for use in a motor according to a third embodiment of the invention for illustration of operations of the self-cooling fan.

FIG. 3 is a diagram showing a construction of a self-cooling fan for use in a motor according to a third embodiment of the invention for illustration of operations of the self-cooling fan. Referring to FIG. 3, the self-cooling fan includes twelve blades 19 and is constructed such that the peripheral-face opening 16 and a closed peripheral section 25 of the blade cover are alternately arranged along the periphery thereof which is partitioned by the blades 19.

According to this embodiment, the peripheral-face opening 16 and the closed peripheral section 25 are provided in the equal number of six so that good weight balance is achieved for reduction of vibrations resulting from the rotation of the self-cooling fan. Furthermore, the cooling-air flow passage from the peripheral-face opening 16 forms a predetermined angle to the axis while a cooling-air flow passage from the closed peripheral section 25 runs along the axis. Hence, with the self-cooling fan located close to and in an opposed relation to the top face of the rotor frame, the cooling air flow along the axis directly cools the rotor frame while the cooling air flow in the angled direction to the axis provides direct cooling of the component or the radiator attached with the electronic component located in the course of the cooling air flow. Thus, the significant cooling effect may be afforded over an extended area.

(Fourth Embodiment)

Figure 4:
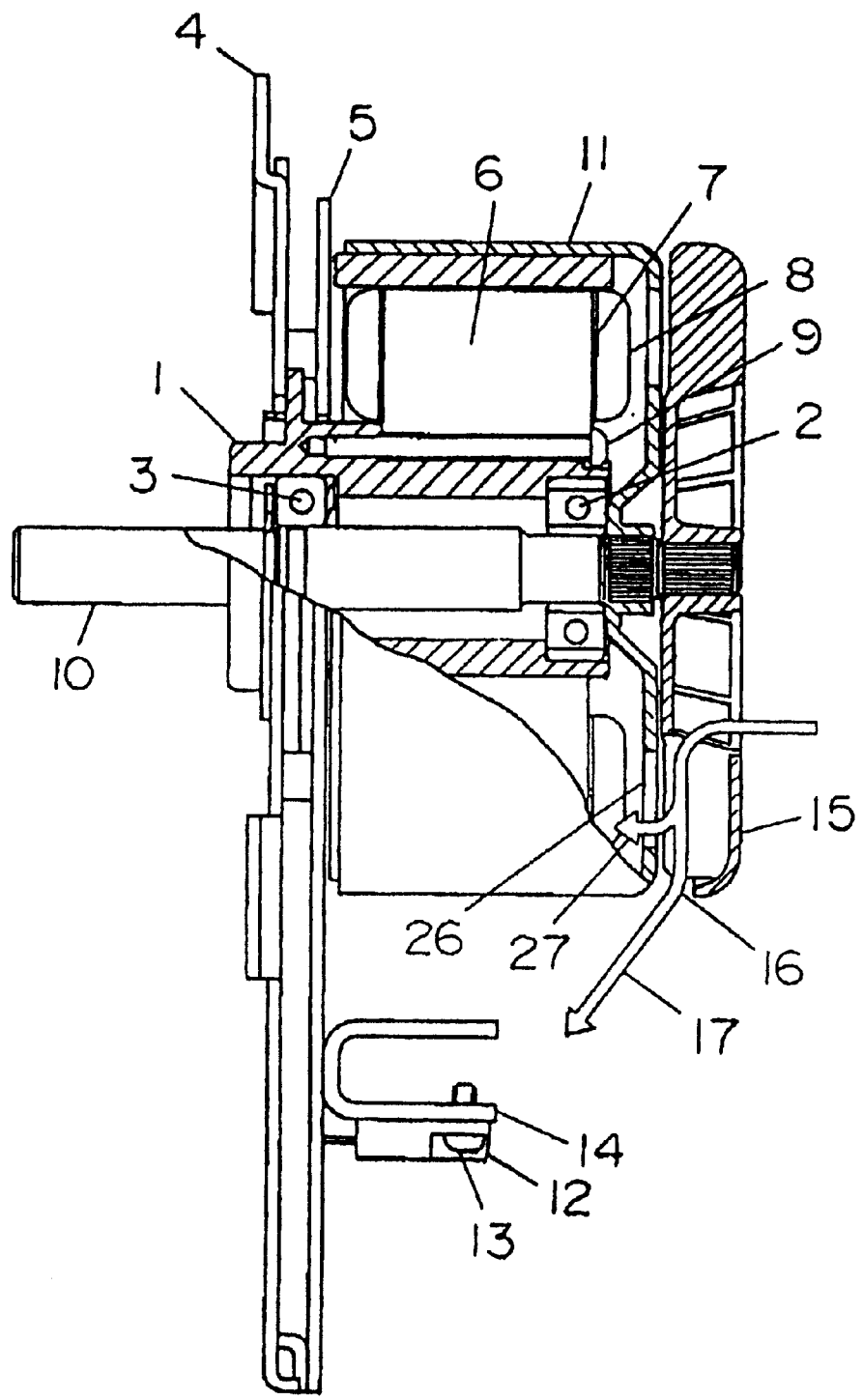
FIG. 4 is a diagram showing a construction of a motor with a self-cooling fan according to a fourth embodiment of the invention.

FIG. 4 shows a construction of a motor with a self-cooling fan according to a fourth embodiment of the invention. Referring to FIG. 4, the housing 1 retains the bearings 2 and 3. The plate 4 retains the printed board 5 and holds the housing 1 by clamping. The core 6 has the winding wire 8 wound thereon via the insulating layer 7 so as to compose the stator. The screw 9 extends through the core 6 to be tightened to the housing 1 thereby pressing the stator against the housing 1 in a fixed relation. The rotor shaft 10 has the rotor frame 11 press-fitted thereon in a fixed relation, the rotor frame adherently retaining the magnet arranged along the periphery of the core 6 via the gap. The rotor shaft is press-fitted in the inner rings of the bearings 2 and 3, the outer rings of which are retained by the housing 1. The self-cooling fan 15 is formed with the peripheral-face opening 16 in its periphery and fixed to the rotor shaft 10 at a place close to and in an opposed relation to the top face of the rotor frame 11. The electronic component 12 is fixed to the radiator plate 14 by means of the screw 13 so as to be mounted to a place in the course of the flow passage 17 of the cooling air guidedly discharged from the peripheral-face opening 16 of the self-cooling fan 15.

In the motor with the self-cooling fan of the aforementioned construction, the winding wire 8 produces heat in proportion to the amount of current flowing therethrough but the heat-producing wire 8 is directly cooled by part 27 of the cooling air that comes from the self-cooling fan 15 rotating unitarily with the rotor shaft 10 and enters through an opening 26 formed in the rotor frame 11. Thus, the temperature is prevented from rising. In addition, the self-cooling fan 15 is formed with the peripheral-face opening 16 in its periphery for establishing the cooling-air flow passage 17 in the radial direction of the rotor. This provides direct cooling of the electronic component 12 and the radiator plate 14 located in the course of the flow passage, thereby accomplishing a notable cooling effect also on the electronic component and the radiator plate.

(Fifth Embodiment)

Figure 5:
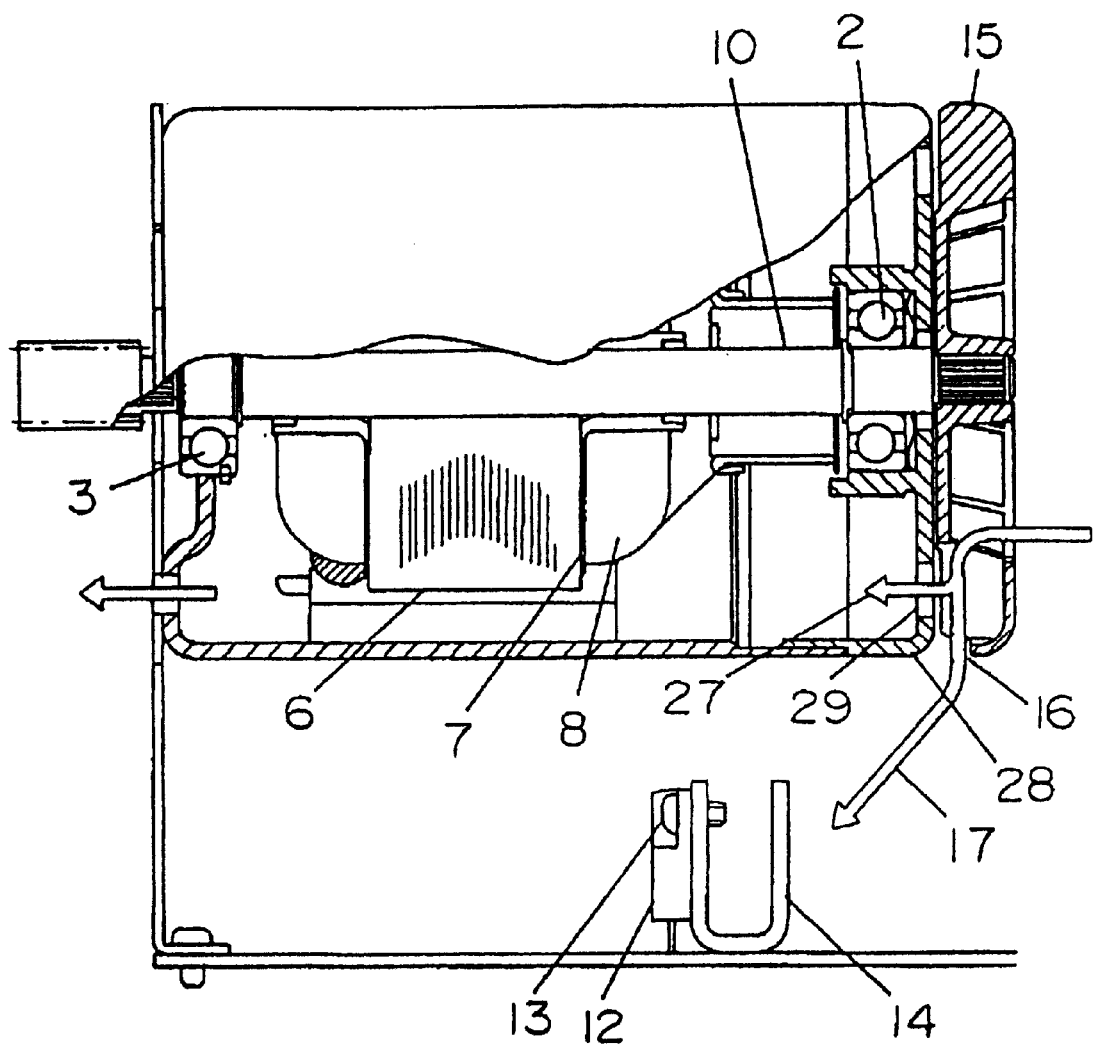
FIG. 5 is a diagram showing a construction of a motor with a self-cooling fan according to a fifth embodiment of the invention.
Figure 6:
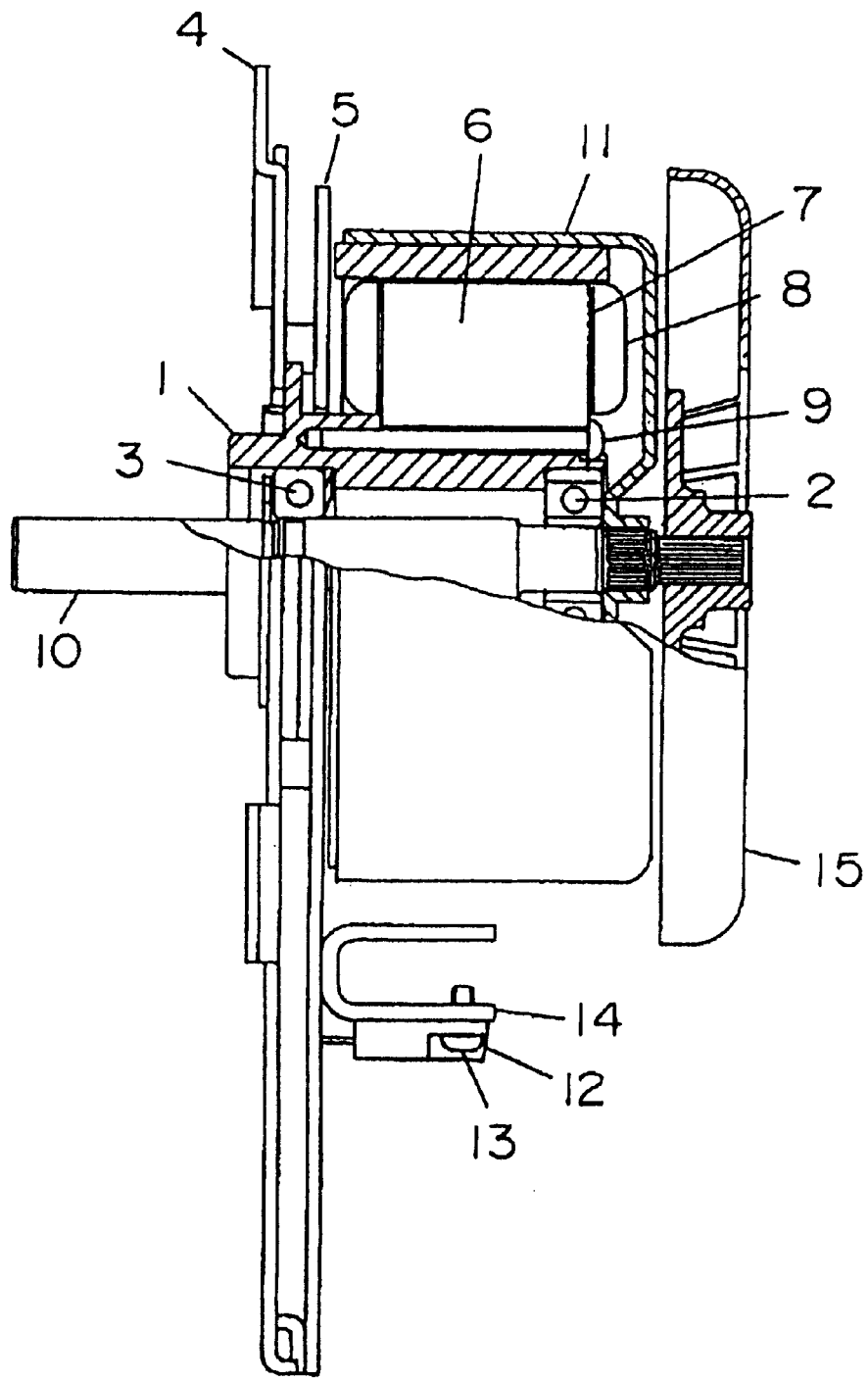
FIG. 6 is a diagram showing a construction of a prior-art motor with a self-cooling fan.

FIG. 5 illustrates a construction of a motor with a self-cooling fan according to a fifth embodiment of the invention. Referring to FIG. 5, the core 6 has the winding wire 8 wound thereon via the insulating layer 7 and is fixed to the rotor shaft 10 so as to compose the rotor. A motor case 28 is formed with an opening 29 in its end face and retains the bearing 2. The bearing 2 has the rotor shaft 10 press-fitted in its inner ring for retention. The self-cooling fan 15 is formed with the peripheral-face opening 16 in its periphery and is fixed to the rotor shaft 10 close to and in an opposed relation to the end face of the motor case 28. The electronic component 12 is fixed to the radiator plate 14 by means of the screw 13 and mounted to a place in the course of the flow passage 17 of the cooling air guidedly discharged from the peripheral-face opening 16 of the self-cooling fan 15.

In the motor with the self-cooling fan of the aforementioned construction, the winding wire 8 produces heat in proportion to the amount of current flowing therethrough but the heat-producing wire is directly cooled by part 27 of the cooling air flow that comes from the self-cooling fan 15 rotating unitarily with the rotor shaft 10 and enters through the opening 29 in the motor case 28. Thus, the temperature can be prevented from rising.

In addition, the self-cooling fan 15 is formed with the peripheral-face opening 16 in its periphery for establishing the cooling-air flow passage 17 in the radial direction of the rotor. This provides direct cooling of the electronic component 12 and the radiator plate 14 located in the course of the cooling-air flow passage, thereby accomplishing a notable cooling effect also on the electronic component and the radiator plate.

What is claimed is:

1. A motor with a self-cooling fan, in which a self-cooling fan (15) is coaxially connected onto a rotor shaft (10) of the motor, wherein the self-cooling fan (15) has a cup-like shape and an outside diameter substantially equal to or less than that of a rotor frame and includes an opening (16) in its periphery for drawing air directly from a side opposite the rotor in the direction of the axis of the rotor and guidingly discharging drawn air in the radial direction of the rotor, and wherein an electronic component (12) or a radiator (14) attached with the electronic component is located in the course of a flow passage (17) of said air drawn and guidedly discharged.

2. A motor with a self-cooling fan as claimed in claim 1, wherein the self-cooling fan (15) has an outside diameter substantially equal to or smaller than that of a motor case (28) and is disposed in close vicinity of a top face of the motor case (28).

3. A motor with a self-cooling fan as claimed in claim 1, wherein a rotor frame (11) holding the rotor shaft (10) is formed with an opening (26) in its top face, in order to introduce air flow partially into the inside of the rotor frame (11), said air flow coming from the self-cooling fan (15) disposed in an opposed relation to said opening.

4. A motor with a self-cooling fan as claimed in claim 1, wherein an opening (29) is formed in a motor case (28) retaining a bearing which holds the rotor shaft (10) rotatably, in order to introduce air flow partially into the inside of the motor case (28), said air flow coming from the self-cooling fan (15) disposed in an opposed relation to said opening.

5. A motor with a self-cooling fan, in which a self-cooling fan (15) is located at a rotor having a rotor shaft (10), wherein the self-cooling fan (15) has a cup-like shape and includes an opening (16) in its periphery for drawing air from the direction of the axis of the rotor and guidingly discharging drawn air in the radial direction of the rotor, wherein the electronic component (12) or a radiator (14) attached with an electronic component is located in the course of a flow passage (17) of air drawn and guidedly discharged, wherein the self-cooling fan (15) comprises a boss (18) holding the rotor shaft (10), a plurality of blades (19) arranged substantially radially with respect to the rotor axis and respectively engaging at one end thereof with the periphery of the boss (18), and a blade cover (22) having a hole in the center thereof and engaging with ridges (20) and peripheral faces (21) of the plurality of blades, said boss, blades and blade cover being integrally formed in one body, and wherein one or more peripheral-face openings (16) are formed by defining an axial length (23) of a peripheral face of said blade cover (22) to be shorter than an axial length (24) of the blade (19).

6. A motor with a self-cooling fan as claimed in claim 5, wherein the self-cooling fan (15) includes an even number of blades (19) and the peripheral-face openings (16) formed in the blade cover (22) are arranged alternately with closed peripheral sections (25) along the periphery of the blade cover which is partitioned by said blades.

* * * * *